United States Patent [19]
Durand

[11] Patent Number: 4,858,880
[45] Date of Patent: Aug. 22, 1989

[54] RESILIENT LOAD SUPPORTING AND MOTION ACCOMMODATING MOUNTING APPARATUS

[75] Inventor: James C. Durand, Peoria, Ill.

[73] Assignee: Caterpillar Inc., Peoria, Ill.

[21] Appl. No.: 55,825

[22] Filed: May 29, 1987

[51] Int. Cl.$^4$ .............................................. F16M 5/00
[52] U.S. Cl. ..................... 248/635; 267/140.3; 267/153; 411/542; 411/907; 248/675
[58] Field of Search ............... 248/675, 635, 615, 562, 248/603, 604; 267/140.3, 141, 153, 141.5, 141.4; 403/221, 227, 224; 411/339, 542, 544, 369, 370, 907, 908

[56] References Cited

U.S. PATENT DOCUMENTS

| | | | |
|---|---|---|---|
| 1,977,896 | 10/1934 | Saurer | 248/635 |
| 2,076,034 | 4/1937 | Lampman | 403/224 X |
| 2,514,811 | 7/1950 | Stephenson et al. | 267/140.3 |
| 2,828,095 | 9/1954 | Beck et al. | 248/9 |
| 2,879,090 | 3/1959 | Everitt et al. | 403/227 |
| 2,890,846 | 6/1959 | Schloss | 267/141.4 |
| 3,304,043 | 2/1967 | Beck | 267/153 X |
| 3,957,127 | 5/1976 | Bouchard | |
| 4,014,588 | 3/1977 | Kohriyama | 403/221 X |
| 4,452,417 | 6/1984 | Krafthefer et al. | 248/604 |

FOREIGN PATENT DOCUMENTS 1233736  2/1967  Fed. Rep. of Germany .
990799   9/1951  France ........................ 267/153
1344062 10/1963  France .
408204   3/1934  United Kingdom .

OTHER PUBLICATIONS

Pages D21 and D22 of an Application Selection Guide published by Barry Controls.
Pages 62-66 of an Industrial Products Catalog published by Lord Corporation.

Primary Examiner—Robert W. Gibson, Jr.
Assistant Examiner—Karen J. Chotkowski
Attorney, Agent, or Firm—John W. Grant

[57] ABSTRACT

Resilient mounting apparatuses are useful for isolating the engine generated vibrations and noise from the frame. The mushroom style resilient mounting apparatuses are generally over designed and add to the cost without any additional benefits. The subject resilient mounting apparatus includes a rebound pad designed to provide high fatigue capacity yet low initial stiffness in a small space and to permit the use of simple manufacturing processes to make it. The primary support includes a skirt which cooperates with the rebound pad to keep foreign material from migrating into an annular space. Thus the subject resilient mounting apparatus meets the functional requirements while avoiding the manufacturing complexity or the extra cost of unneeded material.

13 Claims, 1 Drawing Sheet

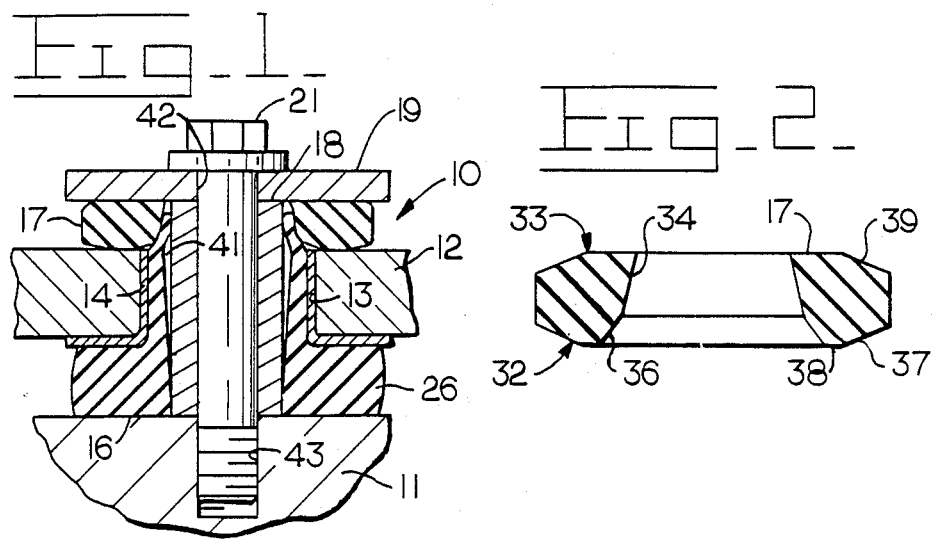
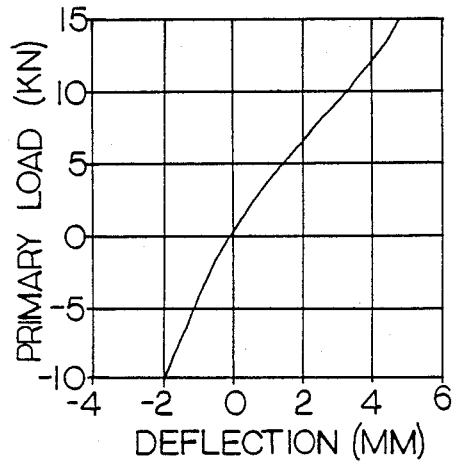
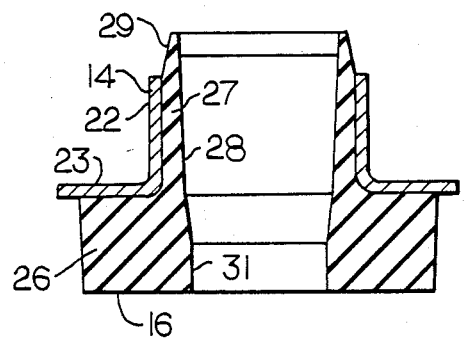

RESILIENT LOAD SUPPORTING AND MOTION ACCOMMODATING MOUNTING APPARATUS

DESCRIPTION

TECHNICAL FIELD

This invention relates generally to resilient mounting apparatuses and more particularly to a non-symmetrical resilient mounting apparatus of the mushroom style.

BACKGROUND ART

Many supported components are connected to a support frame through some sort of resilient mounting apparatus. For example, resilient mounting apparatuses are substantially universally used to connect the engine to the frame of a mobile vehicle to isolate engine generated vibrations and noises from the rest of the vehicle. As would be expected, such resilient mounting apparatuses take on many shapes, styles, sizes, and so forth, depending upon the application and the functional specification of the particular usage.

Two of the more important aspects of any resilient mounting apparatus design are the cost and size which generally go hand in hand since size dictates the amount and type of material used, construction techniques, and so forth, which contribute to the total cost of building the mounting apparatus. The size is generally determined by the available space between the engine and support members and in recent years has become decreasingly smaller. However, regardless of the size and cost, the mounting apparatus must provide proper vibration and/or noise isolation while providing proper deflection control. Moreover, the resilient mounting apparatus must have high fatigue capabilities for long life.

One example of the many styles of resilient mounting apparatuses is commonly referred to as a "mushroom" mounting apparatus. Most of such mounting apparatuses are symmetrical in design and have an annular resilient elastomeric primary support pad between the supporting and supported members and identical annular resilient elastomeric rebound pad on the other side of one of the members with each of the pads having a tubular portion extending into a common hole in either the supporting or supported member. A disadvantage of those mounting apparatuses is that generally the capability of the rebound pad need not be as great as the capability of the primary pad. Thus, by using identical parts for both the primary and rebound loading, the rebound pad is generally over designed for its function and adds significantly to the overall cost of the mounting apparatus. Moreover, providing the tubular projection on both parts also adds to the cost of the mounting apparatus.

One desirable feature used in some of the mushroom style mounting apparatus includes providing an annular air space between the cylindrical portions and a rigid spacer sleeve extending through axially aligned passages in the support and rebound pads. The air space provides a dual spring rate deflection capability in the radial or lateral direction. The heretofore known mounting apparatus did not have any problem of sealing the air space to prevent dirt from migrating into the air space. However, by reducing the amount of material in the mounting apparatus to a minimum and minimizing the use of costly manufacturing techniques, the resilient rebound pad of the present mounting apparatus sometimes separates from the mating supporting or supported member during high loading of the primary support pad. This would permit dirt or other foreign matter to migrate into the air space. Over a period of time the air space would fill up and greatly reduce the dual rate capability.

The present invention is directed to overcoming one or more of the problems as set forth above.

DISCLOSURE OF THE INVENTION

In one aspect of the present invention, the resilient load supporting and motion accommodating mounting apparatus for interconnecting supporting and supported members includes a rigid support having a tubular portion and a flange projecting radially outwardly from one end of the tubular portion, a resilient primary support having a circular head portion bonded to the flange of the rigid support, a tubular portion extending through and integrally bonded to the tubular portion of the rigid support, and a central passage extending axially through the primary support, said tubular portion of the primary support having a skirt extending beyond the tubular portion of the rigid support; and a resilient annular rebound pad having opposite ends and a central passage extending therethrough, one of said ends having an inner chamfer intersecting the central passage and an outer chamfer intersecting the outer peripheral surface of the pad, said inner and outer chamfer forming an axially protruding ridge, said skirt extending into the central passage of the rebound pad and being in sealing engagement with the rebound pad.

The present invention provides a low cost resilient mounting apparatus designed to take maximum advantage of the material used therein without sacrificing the operating characteristics or life expectancy. Since the rebound or negative gravity loads imposed on the support component is generally only 60% to 70% of the positive gravity loads, the size of the rebound pad and, hence, the amount of material required therein relative to the primary support is reduced accordingly. Moreover, the shape of the rebound pad is designed so that very simple manufacturing techniques are employed so that the manufacturing cost is further reduced. The particular shape of the rebound pad is also designed to provide a primary seal for keeping dirt out of an air space intentionally built into the mounting apparatus, to provide a nonlinear axial deflection capability particularly during rebound loading, and to provide high fatigue capability yet low initial stiffness in a small space. A secondary seal function is provided as an additional hindrance to dirt migration into the air space under very high positive loading on the primary support.

BRIEF DESCRIPTION OF THE DRAWINGS

FIG. 1 is a cross sectional view of an embodiment of the present invention in an assembled condition;

FIG. 2 is a cross sectional view of one of the elements of the present invention in its unassembled free state shape.

FIG. 3 is a cross, sectional view of another component of the present invention in its unassembled free state shape; and FIG. 4 is a typical load/defection curve of the present invention.

BEST MODE FOR CARRYING OUT THE INVENTION

A nonsymmetrical resilient load supporting and motion accommodating mounting apparatus 10 is shown as interconnecting a supporting member 11 and a supported member 12. As shown in FIG. 1, the supported member 12 has an opening 13 therethrough and is positioned elevationally above the supporting member 11 and the following description of the mounting apparatus 10 will refer to that relative position of the members.

The resilient mounting apparatus 10 includes a rigid support 14, a resilient primary support 16, a resilient annular rebound pad 17, a rigid spacer sleeve 18, a snubbing washer 19 and a threaded fastener 21.

The rigid support 14 has a tubular portion 22 extending through the opening 13 and a flange 23 projecting radially outwardly from the lower end of the tubular portion 22. The flange is in engagement with the member 12.

The resilient primary support 16 is made from an elastomeric material and has a circular head portion 26, a tubular portion 27 and a central passage 28 extending axially therethrough. The head portion 26 is disposed between the flange 23 and the supporting member 11 and is integrally bonded to the flange. The tubular portion 27 extends through the tubular portion 22 of the rigid support 14 and is integrally bonded thereto. The tubular portion 27 has a skirt 29 extending beyond the tubular portion 22. As best shown in FIG. 3, the outer surface of the skirt 29 has a frusto-conical shape. The central passage 28 has a reduced diameter portion 31 at the lower end of the support while the majority of the central passage has a slight taper with the larger diameter being adjacent the skirt 29.

The rebound pad 17 is positioned between the member 12 and the snubbing washer 19 and has opposite ends 32,33 and a central passage 34 extending therethrough. The rebound pad 17 is also made from an elastomeric material and in the uncompressed state shown in FIG. 2, the end 32 has an inner chamfer 36 intersecting the central passage 34 and an outer chamfer 37 intersecting the outer peripheral surface of the rebound pad 17. The inner and outer chamfers 36,37 form an axially projecting annular ridge 38 having a flat surface. The end 33 also has an outer chamfer 39 intersecting the peripheral surface of the rebound pad. The central passage 34 has a frusto-conical shape similar to the frusto-conical shape of the skirt portion 29. In the assembled position the skirt 29 extends into the central passage 34 and is in sealing engagement with the rebound pad 17.

The rigid spacer sleeve 18 extends through the central passages 28 and 34 and cooperates with the primary support 16 to define an annular air space 41 therebetween.

The snubber washer 19 has a hole 42 therethrough. The threaded fastener 21 in this embodiment is a bolt which extends through the hole 32 and the spacer sleeve 18 and threadably engages a threaded hole 43 in the supporting member 11.

The mounting apparatus 10 can also be used in applications wherein the relative position of the members 11 and 12 is reversed wherein the member 12 is elevationally below the member 11 so that the member 12 becomes the supporting member and the member 11 becomes the supported member. In such applications, the orientation of the mounting apparatus 10 is reversed so that the head portion 26 of the primary support 16 remains positioned between the member 11 and 12.

INDUSTRIAL APPLICABILITY

In use, the components of the resilient mounting apparatus 10 are assembled as shown in FIG. 1. During the assembly procedure, the bolt 21 is threaded into the threaded hole 43 causing both the head portion 26 of the resilient primary support 16 and the rebound pad 17 to be compressed substantially to the shape shown. The spacer sleeve 18 is dimensioned such that the appropriate amount of compressive force is placed on the head portion and rebound pad in the assembled position. As evidenced by FIG. 1 in the assembled condition, the annular ridge 38 of the rebound pad 17 is compressed considerably more than the other portions of the rebound pad.

Compressing the rebound pad 17 in the axial direction also causes some radially inwardly displacement of the resilient material to occur. Such displacement also causes some axial and radial compressive forces to be exerted on the skirt 29.

The head portion 26 of the primary support 16 functions primarily to absorb the positive gravity loads imposed in a downward direction on the supported member 12 while the rebound pad 17 functions to absorb the negative gravity loads. The annular air space 41 provides dual spring rate radial or lateral deflection capability in that the initial lateral movement of the supported member 12 is absorbed by shear stress in the head portion 16 and rebound pad 17. However, in the more severe lateral movement of the supported member 12, the tubular portion 27 engages the rigid spacer sleeve 18 and further movement of the supported member 12 is absorbed by compressing the tubular projection 27.

The uncompressed or free state shape of the rebound pad 17 provides several important functions. First of all the annular ridge 38 serves as a primary seal to keep dirt and other foreign matter out of the annular space 41 when the head portion 26 is compressed during positive loading on the mounting apparatus 10. In those situations, as the head portion 26 becomes compressed, the rebound pad expands toward its free state shape. The ridge 38 thereby stays in contact with the supported member 12 at least during the major portion of the compression of the head portion.

In this type of mounting arrangement the combination of the head portion 26 and the rebound pad 17 are additive in determining the stiffness in both positive and rebound loading. Thus, the shape of the rebound pad of this embodiment not only contributes to the overall stiffness of the resilient mounting apparatus 10 but also is utilized to control the shape of the load deflection curve, particularly during rebound loading. With reference to FIG. 4, it is quite evident that the shape of the curve during negative loading is different than the slope of the curve during positive loading.

Finally, the shape of the rebound pad 17 provides a variable shape factor (i.e., load area divided by the free area) which varies throughout the total range of compression. For example, a low shape factor is provided at the free state shape or lightly loaded condition, a medium shape factor is provided in the assembled condition and changes to a high shape factor in the highly loaded condition. This results in a rebound pad with low initial stiffness which increases during compression and one that has high fatigue capacity for long life expectancy in a small space.

The skirt 29 provides an additional barrier to dirt migration into the annular space 41 during very high positive loading on the resilient primary support 16. Under that infrequently occurring condition, the rebound pad 17 becomes completely unloaded and could loose contact with the member 12. However, the skirt 29 projects upwardly beyond the upper surface of the member 12 and into the passage 34 and thus acts as a dam to keep dirt or other foreign material, which may have collected on the member 12, from migrating into the annular space 41.

In view of the foregoing it is readily apparent that the structure of the present invention provides an improved resilient mounting apparatus which is relatively inexpensive to make while providing the proper operating characteristics and long life expectancy. The shape of the rebound pad is designed to take advantage of very simple manufacturing techniques, to provide a primary seal function to keep dirt out of the air space, and to provide high fatigue capacity yet low initial stiffness in a small space. The skirt of the primary support cooperates with the rebound pad to provide a secondary seal function under severe positive loading on the primary support.

Other aspects, objects and advantages of this invention can be obtained from the study of the drawings, the disclosure and the appended claims.

I claim:

1. A resilient load supporting and motion accommodating mounting apparatus for interconnecting supporting and supported members comprising:
   a rigid support having a tubular portion and a flange projecting radially outwardly from one end of the tubular portion;
   a resilient primary support having a circular head portion bonded to the flange, a tubular portion extending through and integrally bonded to the tubular portion of the rigid support, and a central passage extending axially through the primary support, said tubular portion of the primary support having a skirt extending beyond the tubular portion of the support;
   a resilient annular rebound pad having opposite axial ends and a central passage extending therethrough, one of said axial ends having both an inner and an outer chamfer thereon with the inner chamfer intersecting the central passage and the outer chamfer intersecting the outer peripheral surface of the rebound pad, said inner outer chamfers forming an axially protruding annular ridge on the one axial end; and
   means for sealing the skirt within the central passage of the rebound pad.

2. The resilient mounting apparatus of claim 1 including a rigid spacer sleeve extending through the central passages and cooperating with the primary support to define an annular space therebetween.

3. The resilient load supporting and motion accommodating mounting apparatus for interconnecting supporting and supported members comprising:
   a rigid support having a tubular portion and a flange projecting radially outwardly from one end of the tubular portion;
   a resilient primary support having a circular head portion bonded to the flange, a tubular portion extending through and integrally bonded to the tubular portion of the rigid support, and a central passage extending axially through the primary support, said tubular portion of the primary support having a skirt extending beyond the tubular portion of the support;
   a resilient annular rebound pad having opposite ends and a central passage extending therethrough, one of said ends having an inner chamfer intersecting the central passage and an outer chamfer intersecting the outer peripheral surface of the rebound pad, said inner and outer chamfers forming an axially protruding annular ridge, said skirt extending into the central passage of the rebound pad and being in sealing engagement with the rebound pad; and
   wherein said central passage in the rebound pad has a frusto-conical shape and said skirt has a frusto-conical outer surface similar to the frusto-conical shape of the rebound pad.

4. The resilient mounting apparatus of claim 3 wherein said primary support and said rebound pad are made from an elastomeric material.

5. A resilient load supporting and motion accommodating mounting apparatus for interconnecting supporting and supported members, at least one of said members having an opening therein, comprising:
   a rigid support having a tubular portion extending through the opening in the one member and a flange projecting radially outwardly from one end of the tubular portion and being in engagement with the one member;
   a resilient primary support having a circular head portion disposed between the flange and the other member and integrally bonded to the flange, a tubular portion extending through and integrally bonded to the tubular portion of the rigid support, and a central passage extending axially therethrough, said tubular portion of the primary support having a skirt extending beyond the tubular portion of the rigid support;
   a resilient annular rebound pad having opposite axial ends and a central passage extending therethrough, one of said axial ends normally being in contact with the one member;
   means for sealing the skirt within the central passage of the rebound pad;
   a rigid spacer sleeve extending through the central passages and cooperating with the resilient primary support to define an annular space therebetween;
   a snubbing washer normally engaging the other of said ends of the rebound pad; and
   threaded fastener extending through the snubbing washer and the rigid spacer sleeve and threaded into the other of said members;
   said rebound pad normally being compressed between the one member and the snubbing washer in the assembled condition and having a free state shape wherein said one of said axial ends has both an inner and an outer chamfer with the inner chamfer intersecting the central passage of the rebound pad and the outer chamfer intersecting the outer peripheral surface of the rebound pad, said inner and outer chamfers forming an axially projecting annular ridge on the one axial end in sealing contact with the supported member in the assembled condition.

6. The resilient mounting apparatus of claim 5 wherein said skirt has a free state shape sufficient to act as a dam to keep foreign material form migrating into the annular space.

7. A resilient load supporting and motion accommodating mounting apparatus for interconnecting supporting and supported members, at least one of said members having an opening therein, comprising:
- a rigid support having a tubular portion extending through the opening in the one member and a flange projecting radially outwardly from one end of the tubular portion and being in engagement with the one member;
- a resilient primary support having a circular head portion disposed between the flange and the other member and integrally bonded to the flange, a tubular portion extending through and integrally bonded to the tubular portion of the rigid support, and a central passage extending axially therethrough, said tubular portion of the primary support having a skirt extending beyond the tubular portion of the rigid support;
- a resilient annular rebound pad having opposite ends and a central passage extending therethrough, one of said ends normally being in contact with the one member; said skirt extending into the central passage of the rebound pad and being in sealing engagement with the rebound pad;
- a rigid spacer sleeve extending through the central passages and cooperating with the resilient primary support to define an annular space therebetween;
- a snubbing washer normally engaging the other of said ends of the rebound pad; and
- threaded fastener extending through the snubbing washer and the rigid spacer sleeve and threaded into the other of said members;

said rebound pad normally being compressed between the one member and the snubbing washer in the assembled condition and having a free state shape wherein said one end has an inner chamfer, intersecting the central passage of the rebound pad and an outer chamfer intersecting the outer peripheral surface of the rebound pad, said inner and outer chamfers forming an axially projecting aanular ridge in sealing contact with the supported member in the assembled condition; and wherein said central passage in the rebound pad has a frusto-conical shape and said skirt has a frusto-conical outer surface similar to the frusto-conical shape of the rebound pad.

8. The resilient mounting apparatus of claim 7 wherein said primary support and said rebound pad are made from an elastomeric material.

9. The resilient mounting apparatus of claim 1 wherein said primary support and said rebound pad are made from an elastomeric material.

10. The resilient mounting apparatus of claim 1 wherein said means for sealing includes the skirt extending into the central passage of the rebound pad and directly engaging the rebound pad.

11. The resilient mounting apparatus of claim 3 including a rigid spacer sleeve extending through the central passages and cooperating with the primary support to define an annular space therebetween.

12. The resilient mounting apparatus of claim 5 wherein said primary support and said rebound pad are made from an elastomeric material.

13. The resilient mounting apparatus of claim 7 wherein said skirt has a free state shape sufficient to act as a dam to keep foreign material from migrating into the annular space.

* * * * *